United States Patent
Ho et al.

(10) Patent No.: US 7,652,102 B2
(45) Date of Patent: Jan. 26, 2010

(54) POLYMER CONTAINING FLUOROPOLYMER PROCESSING AID AND CATALYST NEUTRALIZER

(75) Inventors: Thoi H. Ho, Lake Jackson, TX (US); Pascal E. R. E. J. Lakeman, Bergen Op Zoom (NL); Robin J. Lee, Lake Jackson, TX (US); Ronald Wevers, Terneuzen (NL)

(73) Assignee: Dow Global Technologies, Inc., Midland, MI (US)

( * ) Notice: Subject to any disclaimer, the term of this patent is extended or adjusted under 35 U.S.C. 154(b) by 438 days.

(21) Appl. No.: 11/792,459

(22) PCT Filed: Nov. 17, 2005

(86) PCT No.: PCT/US2005/041742

§ 371 (c)(1),
(2), (4) Date: Jun. 6, 2007

(87) PCT Pub. No.: WO2006/062717

PCT Pub. Date: Jun. 15, 2006

(65) Prior Publication Data

US 2008/0097034 A1    Apr. 24, 2008

Related U.S. Application Data

(60) Provisional application No. 60/633,870, filed on Dec. 7, 2004.

(51) Int. Cl.
*C08L 27/12* (2006.01)
(52) U.S. Cl. .................. 525/199; 525/194; 525/195
(58) Field of Classification Search ................ 525/194, 525/195, 199
See application file for complete search history.

(56) References Cited

U.S. PATENT DOCUMENTS

| 4,547,475 A | 10/1985 | Glass et al. |
| 4,740,341 A | 4/1988 | Chu |
| 5,003,023 A | 3/1991 | Foster et al. |
| 5,708,084 A | 1/1998 | Hauenstein et al. |
| 5,708,085 A | 1/1998 | Hauenstein et al. |
| 2004/0242734 A1* | 12/2004 | Lakeman et al. .............. 524/90 |

FOREIGN PATENT DOCUMENTS

| EP | 0722981 B1 | 7/1996 |
| GB | 1460128 | 12/1976 |
| WO | WO-2003055920 A1 | 7/2003 |

OTHER PUBLICATIONS

C. F. J. Den Doelder, R.J. Koopmans, J. Molenaar, "Quantitative modelling of HDPE spurt experiments using wall sip and generalised Newtonian flow", Journal Non-Newtonian Fluid Mech., 1998, 503-514, vol. 79, Elsevier Science B.V.

* cited by examiner

*Primary Examiner*—Bernard Lipman

(57) ABSTRACT

A polymeric composition having improved melt extrusion properties comprising: A) an olefin polymer; B) a catalyst neutralizer comprising a cationic derivative of a poly(oxyalkylene) compound; and C) a processing additive composition comprising a fluoropolymer and optionally, an interfacial agent.

14 Claims, 1 Drawing Sheet

POLYMER CONTAINING FLUOROPOLYMER PROCESSING AID AND CATALYST NEUTRALIZER

CROSS-REFERENCE STATEMENT

This application claims the benefit of U.S. Provisional Application No. 60/633,870, filed Dec. 7, 2004.

BACKGROUND OF THE INVENTION

This invention relates to olefin polymers comprising fluoropolymer processing aid and a cationic polyalkoxylate catalyst neutralizer. Such polymers possess improved melt rheology properties, especially reduced requirement for use of an interfacial agent to produce acceptable performance under melt extrusion conditions.

Olefin polymers such as polyethylene and polypropylene are often produced by use of a transition metal polymerization catalyst thereby leaving small amounts of catalyst residues in the polymer. Such residues are typically deactivated or neutralized to reduce color body formation by homogeneously incorporating a small quantity of a neutralizing compound into the polymer. This is normally accomplished by mixing the additive with the polymer while in a molten state or a polymer stream exiting a polymerization reactor.

WO-93/55920 disclosed the use of cationic derivatives of poly(oxyalkylene) compounds for use as catalyst neutralizers for olefin polymers. Examples included alkali metal-, alkaline earth metal-, and ammonium-derivatives of poly(oxyalkylene) compounds, especially potassium alkoxylate salts of mixed poly(oxyalkylene) compounds. Preferred neutralizers had number average molecular weights from 1000 to 3000 amu. Other conventional catalyst neutralizers include the alkali metal- and alkaline earth-derivatives of long chain fatty acids, especially calcium stearate.

Processing additives (PA) are compositions added to olefin polymer formulations to provide improved processability and throughput in melt compounding or melt extrusion applications. The additives also result in reduced melt fracture and improved surface properties in film and fiber applications. Suitable PA compositions include fluorinated polymers, especially fluoroelastomers or amorphous fluorinated polymers that are flowable at normal extrusion temperatures. Examples include tetrafluoroethylene homopolymers and copolymers, copolymers of vinylidene fluoride and hexafluoropropene, and copolymers of either tetrafluoroethylene, vinylidene fluoride, or hexylfluoropropene with perfluoro (alkyl vinyl)ethers, propene, or 1- or 2-hydropentafluoropropene. Preferred fluoropolymer processing additives have fluorine to carbon ratios of at least 1:2, and preferably at least 1:1. Additional disclosure of suitable fluoropolymer processing additives is found in U.S. Pat. Nos. 6,599,982, 6,642,310, 4,740,341, 3,334,157, and 3,125,547, and elsewhere.

Combinations of fluoropolymer processing additives with additional components are known in the art. In U.S. Pat. Nos. 5,707,569, 5,587,429 and 4,855,360 combinations with an interfacial agent, such as a poly(oxyalkylene) polymer or an ionomer are disclosed. The PA may additionally include conditioners such as talc and/or calcium carbonate.

Disadvantageously, when conventional catalyst neutralizers, such as calcium stearate, are employed in olefin polymer formulations that additionally include a fluoropolymer containing PA, an undesired interaction with the interfacial agent, especially any poly(oxyalkylene) polymer or ionomer, may occur. This may result in a need to use increased quantities of interfacial agent in the PA composition, thereby increasing costs of the additive composition and leading to adverse affects on polymer performance or processability.

In the previously mentioned U.S. Pat. No. 5,707,569, use of a polar side-group containing extrusion adjuvant effective to counteract the deleterious effect of components such as calcium stearate or other divalent or trivalent metal ion containing compounds on the fluoropolymer/interfacial agent containing PA was disclosed. Suitable adjuvants included polar group containing polymers such as vinyl ester homopolymers, copolymers of an olefin and a vinyl ester, copolymers of an olefin and an α,β-unsaturated $C_{3-8}$ carboxylic acid, and ionomeric derivatives thereof (col. 3, line 64-col. 4, line 11).

Accordingly, despite the advance in the art occasioned by polymer blends comprising conventional catalyst neutralizers and fluoropolymer containing PA compositions, further improvement in such polymer compositions is desired. In particular, formulations wherein a reduction in deleterious interference with interfacial agents occurs are still desired. In addition, the attainment of equivalent or improved polymer performance while utilizing reduced quantities of interfacial agent is desired.

SUMMARY OF THE INVENTION

The present invention provides a polymeric composition having improved melt extrusion properties comprising:

A) an olefin polymer;

B) a catalyst neutralizer comprising a cationic derivative of a poly(oxyalkylene) compound; and C) a processing additive composition comprising a fluoropolymer and optionally an interfacial agent.

Due to the presence of the cationic derivative of a poly (oxyalkylene) in the foregoing polymeric composition, it has been discovered that reduced quantities of the interfacial agent can be employed without significant loss of processing properties, and under some processing conditions, an improvement in processing properties is observed. Under some operating conditions a separately added interfacial agent may be eliminated entirely. In addition to reducing the cost of the resulting polymer through reduction of interfacial agent usage, the resulting polymer compositions are characterized by improved processability, increased throughput and reduced surface melt fracture. In essence, the foregoing catalyst neutralizer is employed in a dual capacity to also act both to reduce color body formation and as an interfacial agent, replacing some or all of any deliberately added interfacial agent.

Highly desirably, because the cationic poly(oxyalkylene) derivative is incorporated into the polymer stream generated by a polymerization process prior to devolatilization it is intimately and homogeneously incorporated into the resulting polymer. Subsequent incorporation of a fluoroelastomer in a compounding operation is benefited due to the prior, homogeneous dispersal of the interfacial agent. Compounding with the fluoroelastomer is accordingly beneficially affected. Compared to the use of calcium stearate or similar prior art acid scavenger, interference with the operation of the interfacial agent is substantially reduced. Moreover, reduced quantities of fluoropolymer may be employed while still obtaining good melt extrusion properties.

DETAILED DESCRIPTION OF THE INVENTION

Figure 1:
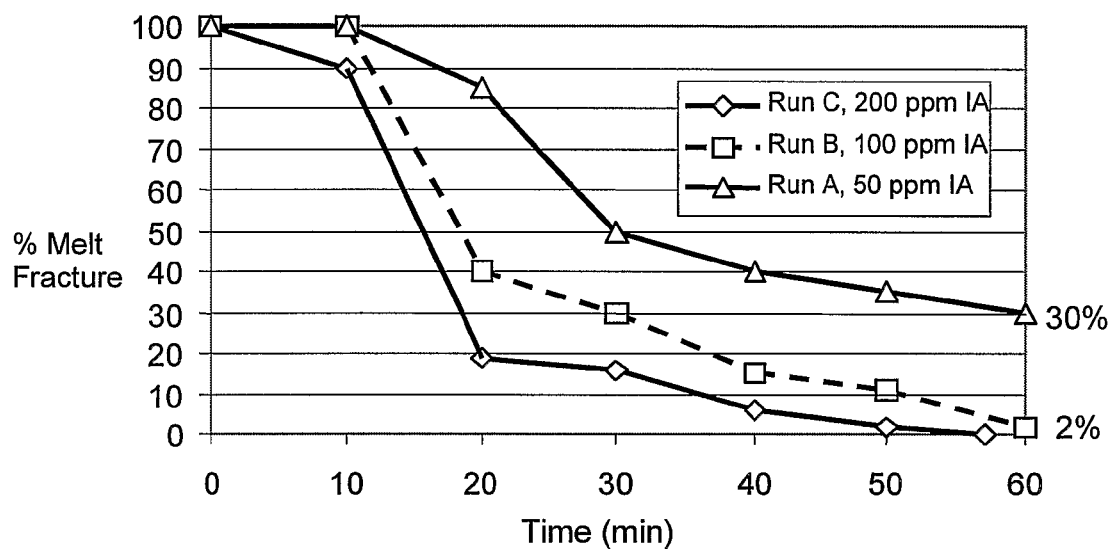
FIG. 1 is a graph of percent melt fracture versus time for the comparative resins tested in Example 1.

For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, raw materials, and general knowledge in the art. Unless stated to the contrary, implicit from the context, or customary in the art, all parts and percents are based on weight.

If appearing herein, the term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, excepting those that are not essential to operability. The term "consisting of", if used, excludes any component, step or procedure not specifically delineated or listed. The term "or", unless stated otherwise, refers to the listed members individually as well as in any combination.

Component A)

Olefin polymers for use herein include any polymer formed by addition polymerization of one or more olefins, especially homopolymers and interpolymers of one or more $C_{2-10}$ α-olefins. Examples include homopolymers of ethylene, propylene, 1-butene or 4-methyl-1-pentene; interpolymers of ethylene with one or more $C_{3-10}$ α-olefins or styrene; interpolymers of two or more $C_{3-10}$ α-olefins; interpolymers of ethylene, one or more $C_{3-10}$ α-olefins and optionally styrene or a $C_{4-20}$ diolefin; and interpolymers of one or more $C_{3-10}$ α-olefins with styrene, a $C_{4-20}$ diolefin or a mixture of styrene with a $C_{4-20}$ α-olefin. Suitable interpolymers include block or random copolymers containing multiple monomer remnants in each polymer chain; graft copolymers containing polymer segments of one or more monomers pendant from a separately prepared polymer; and copolymer blends containing mixtures of individual polymer components, such as blends comprising a matrix of a relatively crystalline polymer component with occlusions or domains of a relatively rubbery polymer or homogeneous blends of two or more olefin polymers.

Preferred olefin polymers for use herein as component A) are isotactic polypropylene, low density polyethylene (LDPE), linear low density polyethylene (LLDPE), and high density polyethylene (HDPE). Highly preferred olefin polymers are LLDPE resins made by copolymerizing ethylene with one or more $C_{3-10}$ α-olefins, especially 1-butene, 1-hexene or 1-octene by use of a transition metal containing catalyst. Preferably, the polymers used as component A) have a density from 0.85 to 0.98 g/cc, more preferably from 0.87 to 0.95 g/cc, and a weight average molecular weight (Mw) from 60,000 to 200,000.

Highly preferred olefin polymers are prepared by use of a catalyst comprising one or more transition metal derivatives and a cocatalyst or activator. Suitable transition metals are metals from groups 3-10 of Periodic Table of Elements. Examples of suitable compounds include titanium halides, vanadium halides, and vanadium oxyhalides or oxides, such as chromium trioxide, and molybdenum trioxide. Also mixed oxy halides, hydrocarbyloxides, mixed halides and hydrocarbyloxides are advantageously used. As the cocatalyst or activator, there may be employed an organic aluminum compound such as trialkyl aluminum, dialkyl aluminum chloride, mixed orgaonaluminum-magnesium complexes or polymeric or oligomeric aluminum oxyalkoxides, such as methylalumoxane.

Suitable catalysts include both Ziegler-Natta catalysts and Phillips-type catalysts as well as complexes containing a transition metal having at least one delocalized π-electron containing ligand or electron donor ligand. Suitable compounds include metallocenes, half metallocenes, constrained geometry catalysts, single site catalysts, and donor complexes, the synthesis and use of which are well known to the skilled artisan.

Preferably, the olefin polymers employed in the present invention are prepared by use of a catalyst composition comprising halogen, a transition metal of Groups 3-6 of the Periodic Table of Elements, and optionally magnesium and/or an alkoxide; and an organoaluminum cocatalyst, specifically a Ziegler-Natta or Phillips type catalyst.

Component B)

Suitable cationic derivatives of poly(oxyalkylene) compounds for use herein are compounds resulting from the base catalyzed polymerization of one or more alkylene oxides, preferably ethylene oxide (EO), propylene oxide (PO) and/or butylene oxide (BO) with a monovalent or polyvalent reactive proton group containing initiator compound. If more than one alkylene oxide is used in the preparation of the additive composition, such alkylene oxides may be reacted simultaneously or sequentially, resulting in randomly distributed or sequentially distributed alkyleneoxy groups. By sequential reaction of different alkylene oxides, blocks of the different units will be present. When a different alkylene oxide is added at the end of the reaction of another alkylene oxide, a so-called capped or tapered poly(alkyleneoxy) compound is obtained. Depending on the quantity of initial alkylene oxide remaining in the reactor when the capping monomer is added, the resulting polymer sequence may be essentially or completely homopolymeric or copolymeric in nature.

Preferred catalyst neutralizer compounds are selected from cationic derivatives of poly(oxyalkylene) compounds and polyester polyols corresponding to the formula:

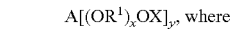

$A[(OR^1)_xOX]_y$, where

A is the residue of an initiator having one or more active hydrogen atoms;

y is a number from 1 to 10;

$R^1$ independently each occurrence can be the same or different, and is selected from the group consisting of $C_{2-4}$ alkylene, preferably 1,2-ethylene, 1,2-propylene or 1,2-butylene;

x is the number from 1 to 1000, preferably from 5 to 500 and most preferably from 10 to 300; and X is a cation.

Suitable initiator compounds include water, ammonia, or an organic compound comprising one or more substituents selected from the group consisting of OH, SH, COOH, COSH, CSSH, $NHR^a$ wherein $R^a$ is hydrogen or a hydrocarbyl group of up to 50 carbon atoms. The initiator compound and $R^a$ may contain saturated or unsaturated, linear or branched, aliphatic, aromatic or cycloaliphatic groups.

Monomeric or polymeric initiators may be used. Preferred initiators are water, alcohols, alkylene glycols, alkyleneglycol monoethers, poly(oxyalkylene) compounds, polycaprolactones, and poly(oxyalkylene) monoethers. A most preferred initiator compound is water, ethylene glycol or propylene glycol.

The number of cations in the additive composition will depend on the functionality of the initiator molecule, the number of reactive protons remaining after polymerization of the alkylene oxide with the initiator compound, and the degree of neutralization with a base. Preferably an initiator compound having a functionality from 1 to 4, more preferably 1 or 2 is employed. Preferred cations are alkali metal cations, especially potassium or sodium. Alternatively, ammonium cations of the formula $[R^b_4N]^+$ wherein $R^b$ independently each occurrence is hydrogen or a hydrocarbyl group of from 1 to 25 carbon atoms, preferably an alkyl group of from 1 to 18 carbon atoms, more preferably of 1-10 carbon atoms may be utilized.

Preferred cationic derivatives of poly(oxyalkylene) compounds for use herein are monopotassium- or dipotassium-poly(alkyleneoxy)alkoxylates containing ethyleneoxy-, propyleneoxy- or butyleneoxy-repeat units, or mixtures thereof, and having number average molecular weights from 500 to 5,000, more preferably from 1,000 to 2,500. Highly desirably, the catalyst neutralizer comprises at least 50 weight percent of propyleneoxy- or butyleneoxy-units, more preferably at least 60 weight percent, capped with less than 50 weight percent of ethylene oxide derived units, preferably less than 40 weight percent, yet preferably more than 1, suitably more than 2 weight percent. By the term "capped" is meant that the terminal portions of the polymer primarily comprise the ethylene oxide derived units.

The cationic poly(oxyalkylene) derivative may be employed in the neutralization of catalyst residues and byproducts in olefin polymers as a neat compound, as a mixture of neat compounds, or as a mixture with additional compounds, especially neutral alkylene glycol and poly(oxyalkylene) compounds or mixtures thereof, hydrocarbon diluents, or conventional catalyst neutralizers or deactivators. In one embodiment, the cationic poly(oxyalkylene) derivative may be substituted for some or all of a conventional catalyst termination agent, such as water, $CO_2$, or an alcohol in a polymerization process.

Desirably the olefin polymer composition contains at least 0.01 weight percent, preferably at least 0.02 weight percent, most preferably at least 0.05 weight percent of cationic derivative of a poly(oxyalkylene) compound, and at most 15 weight percent, preferably at most 5 weight percent, most preferably at most 2.5 weight percent, based on total composition weight.

Component C)

The fluoropolymer components useful in this invention preferably are elastomeric fluoropolymers (fluoroelastomers), which are fluorine containing organic polymers having Tg values less than 25° C. and which exhibit little or no crystallinity. It is preferred, but not essential, to employ fluoropolymers having a fluorine to hydrogen ratio of at least 1:1.5. Fluorinated monomers which may be copolymerized to yield suitable fluoropolymers include vinylidene fluoride, hexafluoropropylene, chlorotrifluoroethylene, tetrafluoroethylene and perfluoroalkyl perfluorovinyl ethers. Specific examples of the fluoropolymers which may be employed include copolymers of vinylidene fluoride and a comonomer selected from hexafluoropropylene, chlorotrifluoroethylene, 1-hydropentafluoropropylene, and 2-hydropentafluoropropylene; copolymers of vinylidene fluoride, tetrafluoroethylene, and hexafluoropropylene or 1- or 2-hydropentafluoropropylene; and copolymers of tetrafluoroethylene, propylene and, optionally, vinylidene fluoride, all of which are known in the art. In some cases these copolymers may also include bromine-containing comonomers as taught in U.S. Pat. No. 4,035,565, or terminal iodo-groups, as taught in U.S. Pat. No. 4,243,770. Preferably the fluoropolymers employed in the compositions of this invention contain a fluorine to carbon molar ratio of at least 1:2 and more preferably at least 1:1. Highly preferred fluoropolymers comprise copolymerized units of i) vinylidene fluoride/hexafluoropropylene; ii) vinylidene fluoride/hexafluoropropylene/tetrafluoroethylene; iii) tetrafluoroethylene/propylene; or iv) tetrafluoroethylene/propylene/vinylidene fluoride. Examples of suitable fluoropolymers employed in the present compositions are disclosed in U.S. Pat. Nos. 6,774,164, 6,642,310, 6,610,408, 6,599,982, 6,512,063, 6,048,939, 5,707,569, 5,587,429, 5,010,130, 4,855,360, 4,740,341, 3,334,157, and 3,125,547, The quantity of fluoropolymer incorporated into the polymer composition of the invention is an amount sufficient to achieve improved extrusion properties in the resulting composition. One measure of such improvement includes delaying the onset of melt defects in extruded polymers to higher extrusion shear rates than could be achieved in the absence of the fluoropolymer, or by permitting the extruder to equilibrate and produce melt-defect-free extrudate in less time than would be required for an extrudate lacking in fluoropolymer at the same extrusion conditions. This permits the use of less fluoropolymer additive as well as the use of higher extruder throughputs and shorter extruder start up times, resulting in more economical extrusion operation. Preferred quantities of fluoropolymer employed in the present composition are from 0.001 to 1.0 weight percent, preferably from 0.005 to 0.1 weight percent, based on total composition weight.

In addition to the fluoropolymer, the processing additive composition may include one or more interfacial agents. By "interfacial agent" is meant a thermoplastic polymer which is characterized by 1) being in the liquid state (or molten) at the extrusion temperature, 2) having a lower melt viscosity than both component A) and the fluoropolymer, and 3) freely wets the surface of the fluoropolymer particles in the extrudable composition.

More particularly, the interfacial agent is a relatively low molecular weight ingredient which, for a particular system of fluoropolymer process aid and olefin polymer, preferentially locates at the interface between these two polymers. While not wishing to be bound by any particular explanation, it is believed that the interfacial agent functions by reducing the shear stress on the fluoropolymer particles during melt processing of olefin polymer, thereby reducing the ability of melt processing equipment to reduce the size or otherwise affect the dispersion of the fluoropolymer particles.

Examples of such interfacial agents include, but are not limited to i) silicone-polyether copolymers; ii) aliphatic polyesters such as poly(butylene adipate), poly(lactic acid) and polycaprolactone polyesters; iii) aromatic polyesters such as diisobutyl phthalate; iv) amine oxides, such as octyldimethyl amine oxide; v) carboxylic acids such as 2-hydroxybutanedicarboxylic acid; vi) fatty acid esters such as sorbitan monolaurate and triglycerides; and vii) poly(oxyalkylene) polymers, including poly(alkylene) glycols and their derivatives as disclosed in U.S. Pat. No. 4,855,360. Preferred interfacial agents have number average molecular weights in the range from 1000 to 32000, preferably 2000 to 10000, and most preferably 2000 to 4000.

Preferred interfacial agents are selected from polycaprolactones, poly(oxyalkylene) compounds and polyester polyols. Suitable poly(oxyalkylene) compounds useful in this invention can include poly(oxyalkylene) polyols and their derivatives corresponding to the formula:

$$A[(OR^1)_xOR^2]_y, \text{ where}$$

A is as previously defined, and preferably is the residue of an initiator having a plurality of active hydrogen atoms, such as a polyhydroxyalkane, a polyether polyol, a polyester, or a polycarboxylic acid;

y is as previously defined, preferably 2, 3 or 4;

$R^1$ independently each occurrence can be the same or different, and is selected from the group consisting of $C_{1-8}$ alkylene groups, preferably $C_{2-4}$ alkylene groups, more preferably 1,2-ethylene, 1,2-propylene or 1,2-butylene;

x is the number from 1 to 1000, preferably from 5 to 500 and most preferably from 10 to 300; and $R^2$ is H or a $C_{1-10}$ monovalent organic radical, preferably H or an alkyl, aryl, aralkyl, alkaryl, acetyl, benzoyl or stearoyl group.

Representative interfacial agents include poly(oxyalkylene) polyol derivatives wherein the terminal hydroxy groups have been partly or fully converted to ether derivatives or ester derivatives, for example stearate groups, ($C_{17}H_{35}COO-$). Other useful interfacial agents are polyesters, such as compounds prepared by reaction of dicarboxylic acids or lactones with poly(oxyalkylene) glycols. An especially preferred interfacial agent is a poly(oxyalkylene)glycol or an ether derivative thereof or a polyester polyol, especially a (poly) alkyleneoxide derivative of caprolactone or polycaprolactone.

Suitable poly(oxyalkylene) interfacial agents for use in this invention include those sold under the trademark Carbowax™, such as Carbowax™ 3350, a polyethylene glycol containing about 76 repeat units, available from The Dow Chemical Company, and those sold under the trademark Pluronic™, such as Pluronic™ F-77, an ethylene oxide capped derivative of poly(propylene) glycol containing about 35 propylene oxide units and 108 ethylene oxide units, available from BASF Corporation.

The interfacial agent may be introduced to the mixture of fluoropolymer and olefin polymer at any point up to and including the final melt shaping process. It is most desirable to combine the fluoropolymer and interfacial agent in a masterbatching step where both ingredients are present at high concentration, that is at greater than or equal to 1 percent based on the total weight of masterbatch. The quantity of interfacial agent employed is an amount sufficient to obtain, preserve or increase the benefits of the fluoropolymer in the resulting composition. Preferred quantities of interfacial agent based on moles of fluoropolymer are up to 10:1, preferably from 0.5:1 to 5:1.

Commercially available compositions may include a fluoropolymer and an interfacial agent already combined, optionally in the form of a concentrate in a suitable base resin which is normally a linear polyethylene. Examples of such commercially available compositions include a combination of a fluororelastomer and a polyalkylene glycol or an alkyleneoxide derivative of polycaprolactone sold under the tradenames: Viton® FreeFlow™ Z-100 and Z-200, available from E. I. Dupont de Nemours and Company.

The method by which the respective components are incorporated into the polymer is not critical to successful practice. In one embodiment, the catalyst neutralizer may be added at the end of the polymerization zone or downstream from the polymerization zone. The reaction mixture emerging from the polymerization reactor or zone after completion of polymerization may contain the olefin polymer, unaltered monomers, the polymerization catalyst a part of which may still be active, and optionally inert hydrocarbon diluents and/or a catalyst terminating agent. Suitable catalyst terminating agents include water, alcohols, $CO_2$, and CO.

The catalyst neutralizer may be simply mixed with the polymer stream by combining the neutralizer either in neat form or as a solution in an inert diluent with the polymer stream before or after devolitilization. Preferably, the catalyst neutralizer is added to the polymer stream after termination of the catalyst and before the polymer, and optional diluent, is subjected to separation steps to remove unreacted monomer or solvent. Such removal is typically done while increasing the temperature or decreasing the pressure, or both, to flash off the monomer and diluent. There can be one or two or more of such separation steps in sequence. In a solution polymerization process or in a high temperature high-pressure polymerization process, the polymer, catalysts residues and catalyst neutralizer remain within the molten polymer stream whereas the unreacted monomers, diluent and other gases are removed therefrom.

Because of the ease of incorporating additives into polymer streams prior to devolatilization and the avoidance of subsequent remelting of the polymer to incorporate additives by melt compounding, the fluoropolymer may also be added to the polymer stream at the same time or nearly the same time as addition of component B), that is, prior to devolatilization and recovery of the resulting polymer product. Alternatively, component C) or both component B) and component C) may be subsequently incorporated into the olefin polymer by well known melt compounding techniques, including use of masterbatch of either component, wherein a polymer carrier containing the additive or additives in concentrated form is blended with the polymer to be treated and the resulting mixture melted and thoroughly mixed prior to pelletization or extrusion into shaped articles.

The resultant olefin polymer may also comprise conventional additives such as stabilizers, UV-absorbers, antistatic agents, antiblocking agents, lubricants, pigments, inorganic or organic fillers, fire-retardant compounds, anti-drip agents, or additional polymers such as rubbers or polysiloxane polymers. Examples of these additives may include Ionox™ 330 (Shell Co.); Goodrite™ 3114 (Goodrich Co.); Irganox™ 1010, 1076, Irgafos™ 168, Tinuvin™ 327 (Ciba-Geigy Co.); Weston™ 618 (Borgwarner Co.); LS™ 770, LS™ 622 (Sankyo Co.).

The polymers as obtained according to the present invention are suitable for many types of applications, including those that require excellent optical properties and high stretch ratios, such as fiber spinning applications, injection molding, blow molding, rotomolding, and blown or cast film applications.

The following enumerated specific embodiments are provided as enablement for the appended claims:

1. A polymeric composition having improved melt extrusion properties comprising:
   A) an olefin polymer;
   B) a catalyst neutralizer comprising a cationic derivative of a poly(oxyalkylene) compound; and
   C) a processing additive composition comprising a fluoropolymer and optionally an interfacial agent.

2. The composition according to embodiment 1 wherein the olefin polymer is selected from the group consisting of isotactic polypropylene, low density polyethylene (LDPE), linear low density polyethylene (LLDPE), and high density polyethylene (HDPE).

3. The composition according to embodiment 1 wherein olefin polymer is a copolymer of ethylene with one or more $C_{3-10}$ α-olefins prepared by use of a transition metal containing catalyst composition.

4. The composition according to embodiment 3 wherein the catalyst composition comprises halogen, a transition metal of Groups 3-6 of the Periodic Table of Elements, and optionally magnesium and/or an alkoxide; and an organoaluminum cocatalyst.

5. The composition according to any one of embodiments 1-4 wherein the catalyst neutralizer is a monopotassium- or dipotassium-poly(alkyleneoxy)alkoxylate containing from 1 to 10 ethyleneoxy-, propyleneoxy-, or mixed ethyleneoxy-/propyleneoxy-repeat units and having a number average molecular weight from 500 to 5,000.

6. The composition according to embodiment 5 comprising 0.01 to 15 percent of monopotassium- or dipotassium-poly (alkyleneoxy)alkoxylate based on total composition weight.

7. The composition according to any one of embodiments 1-4 wherein Component C) comprises a fluoropolymer.

8. The composition according to embodiment 7 wherein the fluoropolymer is a copolymer of vinylidene fluoride and a comonomer selected from hexafluoropropylene, chlorotrifluoroethylene, 1-hydropentafluoropropylene, and 2-hydropentafluoropropylene; a copolymer of vinylidene fluoride, tetrafluoroethylene, and hexafluoropropylene or 1- or 2-hydropentafluoropropylene; or a copolymer of tetrafluoroethylene, propylene and, optionally, vinylidene fluoride.

9. The composition according to embodiment 8 wherein the fluoropolymer comprises copolymerized units of i) vinylidene fluoride/hexafluoropropylene; ii) vinylidene fluoride/hexafluoropropylene/tetrafluoroethylene; iii) tetrafluoroethylene/propylene; or iv) tetrafluoroethylene/propylene/vinylidene fluoride.

10. The composition according to embodiment 7 comprising from 0.001 to 1.0 percent of fluoropolymer based on total composition weight.

11. The composition according to embodiment 5 wherein Component C) comprises an interfacial agent selected from polycaprolactones, poly(oxyalkylene) compounds and polyester polyols.

12. The composition according to embodiment 11 wherein the interfacial agent corresponds to the formula:

A is the residue of an initiator having a plurality of active hydrogen atoms;

y is 2, 3 or 4;

$R^1$ independently each occurrence can be the same or different, and is selected from the group consisting of $C_{1-8}$ alkylene groups;

x is the number from 1 to 1000; and $R^2$ is H or a $C_{1-10}$ monovalent organic radical.

13. The composition according to embodiment 11 wherein the interfacial agent is a polycaprolactone polymer.

14. The composition according to embodiment 12 wherein the interfacial agent is present in a molar amount from 0.5:1 to 5:1 based on fluoropolymer.

The invention is further illustrated by the following examples that should not be regarded as limiting of the present invention. Unless stated to the contrary or conventional in the art, all parts and percents are based on weight.

EXAMPLES

Relative averaged molecular weight of the catalyst neutralizer compound is determined by gel permeation chromatography (GPC). 50 microliters of a sample solution (about 150 mg sample in 10 ml THF) is introduced onto the GPC column (filled with porous-particle column packing PL-Gel (5 μm); columns in series filled with PS/DVB of 50, 100, 500 and 1000 Å (30 cm each)). THF is used as eluent at a flow rate of 1 ml/min. The columnbox is maintained at a temperature of 35° C. A Waters DRI 410™ differential refractometer is used as the detector.

Melt index of the olefin polymer is determined according to ASTM-D-1238 Procedure A, Condition E at 190° C./2.16 kg.

The content of potassium in the catalyst neutralizer is calculated by a standard acid-base titration method. The additive composition sample is dissolved in 2-propanol and titrated with hydrochloric acid to the desired equivalence point. The content of potassium may also be measured by Flame photometry AOD-S method.

OH determination of the catalyst neutralizer is measured by titration according ASTM D-4274D.

Example 1

750 gram of difunctional dipropylene glycol initiator and 430.6 gram KOH, 45 percent in water solution, are charged into a stainless steel 10 liter reactor, which is then flushed with nitrogen, heated up to 115° C., and the water flashed off at 3.0 kPa for 3 hours. After flashing, the initiator contained 0.77 percent water and 7.76 percent KOH. Propylene oxide (9608 g) is added over 5.5 hours at 125° C. and 300-400 kPa, and digested for 3 hour at 125° C. Ethylene oxide (724 grams) is added over 0.5 hours at 125° C., 200-300 kPa, and the mixture is maintained for 5 hours at 125° C. After cooling to 40° C., the contents of the reactor are discharged into a steel container under nitrogen atmosphere. The resulting product (referred to as KAO) has a molecular weight of 1800, ethylene oxide content of 7 percent and potassium content of 1 percent.

An ethylene/1-octene polymer is prepared in two continuous stirred tank reactors (CSTR's) of 5 liters volume each, operated in series. The reactors are equipped with a shell to keep the reactor volume at adiabatic conditions. The feed to the first reactor comprises a mixture of $C_{8-10}$ n-alkane containing 20 percent ethylene which is charged at a rate of 30 kg/hr. The temperature of the solvent/ethylene feed is 15° C. and the pressure is maintained at 3.5 MPa. 1-Octene is added as a separate stream into the first reactor. By an additional separate stream, fresh solvent, a Ziegler-Natta procatalyst comprising a suspension of a $MgCl_2$ supported $TiCl_4$ in the same n-alkane mixture is injected into the first reactor at a rate of about 0.01 g Ti/hr. The procatalyst is prepared essentially according to the procedure of U.S. Pat. No. 4,547,475 and contains Mg/Cl/Al/Ti in the mole ratios 13/35/4/1. Together with the procatalyst, triethylaluminum cocatalyst is fed in an amount of 3.5 mole of Al per mole of Ti. During the subsequent polymerization of the ethylene/octene mixture, approximately 80 percent of the ethylene is converted and the reactor temperature increases to 180° C. The reaction mixture comprising dissolved polymer enters into the second reactor where approximately 10 percent additional ethylene is converted, increasing the reaction temperature to 200° C. at a pressure of 3.5 MPar. About 5.2 kg polymer per hour is so formed having a melt index of 3.0 and a density of 0.914 g/cm³ and containing about 12 percent polymerized 1-octene.

After the product stream containing polymer, monomer, solvent and catalyst leaves the second reactor, water (20 ppm based on polymer weight) is injected and the product stream is passed through an in-line static mixer. After allowing the water to react with the catalyst residue for 10 seconds, 0.2 percent of either KAO or calcium stearate catalyst neutralizer composition is added as a 10 weight percent solution in mixed $C_{8-10}$ alkanes solvent. Hindered phenol antioxidant (Irganox™ 1010 from Ciba Geigy Corporation) and phosphorus stabilizer (Irgafos™ 168, also from Ciba-Geigy Corporation) are added to the polymer streams at 500 ppm and 1200 ppm respectively.

The product streams comprising polymer, solvent, ethylene, 1-octene, inactivated catalyst, additives, or the resulting reaction products or residues is devolatilized in a two stage devolatilization process. The resulting molten polymer stream then passes through a melt forming die and cutter, and is cooled in a water bath to give solid pellets. Samples of the two resins are compounded with a commercially available polyethylene resin concentrate containing a vinylidenefluoride/hexafluoropropene (60/40 by weight) copolymer having a Mooney viscosity ML(1+10) at 121° C. (measured according to ASTM D-1646, large rotor) of 55.

Compositions according to the invention (runs 1-3) and comparative compositions (runs A-C) are prepared by dry blending all the ingredients and melt mixing the composition using a 30 mm co-rotating twin screw extruder operating at a screw speed of 300 rpm and a barrel set temperature of 200° C. The quantity of fluoropolymer in each resin is maintained at 100 ppm. Interfacial agent IA is a polycaprolactone polymer derived from the ring opening reaction of epsilon-caprolactone, initiated by 1,4-butanediol, having number average molecular weight of 4000.

Blown films 25 μm in thickness are produced from these compositions using a 2.5 inch (0.98 cm) 24:1 L/D extruder equipped with a 4 inch (1.58 cm) blown film die having a 0.060 inch (0.24 mm) gap. Barrel zone temperatures (starting at the feed section) are 160° C., 180° C., 194° C., and 190° C., with adapter and die temperatures of 200° C. Melt temperatures for each run are from 212-214° C., and the die pressure at the start of each run is 28 MPa. The screw is a conventional design with a barrier flight, operating at 40 rpm. Extruder output at the start of each run is 45 kg/h, resulting in apparent shear rates in the die gap of approximately 500 $sec^{-1}$.

Prior to each test run, the extruder and die are purged with a purge compound containing 50 percent diatomaceous earth in order to remove residues from the previous test. After purging, blown film is produced using 100 percent LLDPE for 10 minutes to ensure that each test begins with 100 percent melt fracture.

When the composition being tested is charged to the extruder, the test is initiated. The melt fracture removal performance of each composition was monitored by continuous visual observation of the roughness of the melt exiting the die and by visual measurement of the resulting film. When no melt fracture is visible in this manner, the experiment is terminated and the conditioning time recorded. If melt fracture (MF) is still present after 60 minutes of running time, the test is terminated and the percent melt fracture recorded.

Film samples collected at various times during the run are analyzed for melt fracture using an overhead projector to visually identify melt defects. Along a line drawn on the film sample perpendicular to the direction of film extrusion, the widths of areas containing film defects are measured. The sum of the widths containing defects divided by the total width of the film sample gives the percent melt defects which is reported as melt fracture (MF).

Figure 2:
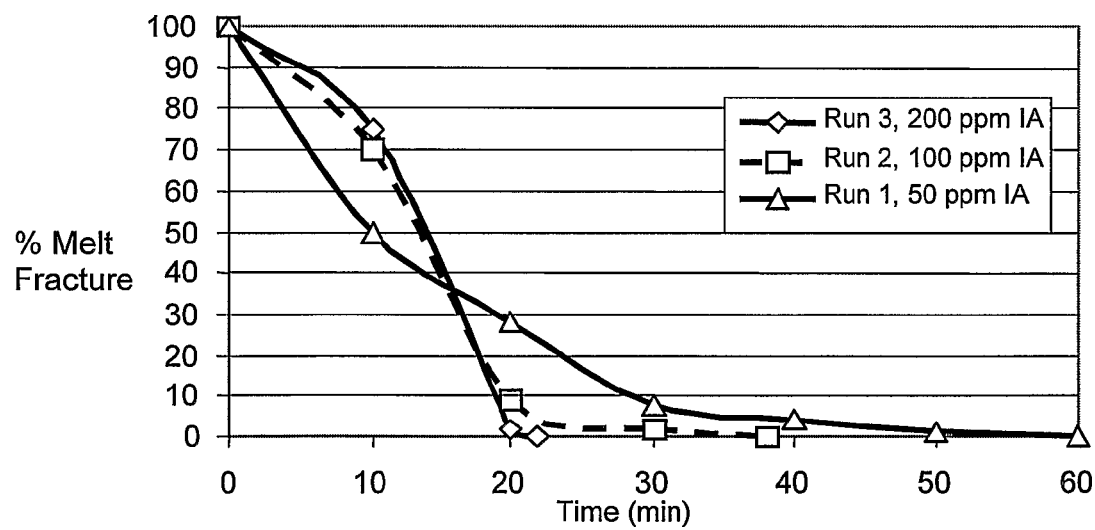
FIG. 2 is a graph of percent melt fracture versus time for resins of runs 1-3 tested in Example 1.

Details of the resins tested are located in Table 1. Results are graphically represented in FIG. 1 for the comparative resins and in FIG. 2 for the resins of runs 1-3.

TABLE 1

| Run | Neutralizer (ppm) | IA (ppm) | Time to 0 MF (min) | MF Remaining (Percent) |
|---|---|---|---|---|
| A* | Calcium Stearate (1200) | 50 | >60 | 30 |
| B* | " | 100 | >60 | 2 |
| C* | " | 200 | 57 | 0 |
| 1 | KAO (1400) | 50 | 60 | 0 |
| 2 | " | 100 | 38 | 0 |
| 3 | " | 200 | 20 | 0 |

*Comparative, not an example of the invention

Based on these results, it is believed that resins containing KAO catalyst neutralizer tend to interfere less with interfacial agent compared to conventional catalyst neutralizers, as exemplified by calcium stearate.

The invention claimed is:

1. A polymeric composition having improved melt extrusion properties comprising:
   A) an olefin polymer;
   B) a catalyst neutralizer comprising a cationic derivative of a poly(oxyalkylene) compound; and
   C) a processing additive composition comprising a fluoropolymer and optionally, an interfacial agent.

2. The composition according to claim 1 wherein the olefin polymer is selected from the group consisting of isotactic polypropylene, low density polyethylene (LDPE), linear low density polyethylene (LLDPE), and high density polyethylene (HDPE).

3. The composition according to claim 1 wherein olefin polymer is a copolymer of ethylene with one or more $C_{3-10}$ α-olefins prepared by use of a transition metal containing catalyst composition.

4. The composition according to claim 3 wherein the catalyst composition comprises halogen, a transition metal of Groups 3-6 of the Periodic Table of Elements, and optionally magnesium and/or an alkoxide; and an organoaluminum cocatalyst.

5. The composition according to any one of embodiments 1-4 wherein the catalyst neutralizer comprises a monopotassium- or dipotassium poly(alkyleneoxy)alkoxylate containing from 1 to 10 ethyleneoxy-, propyleneoxy-, or mixed ethyleneoxy-/propyleneoxy-repeat units and having a number average molecular weight from 500 to 5,000.

6. The composition according to claim 5 comprising 0.01 to 15 percent of monopotassium- or dipotassium poly(alkyleneoxy)alkoxylate based on total composition weight.

7. The composition according to any one of embodiments 1-4 wherein Component C) comprises a fluoropolymer.

8. The composition according to claim 7 wherein the fluoropolymer is a copolymer of vinylidene fluoride and a comonomer selected from hexafluoropropylene, chlorotrifluoroethylene, 1-hydropentafluoropropylene, and 2-hydropentafluoropropylene; a copolymer of vinylidene fluoride, tetrafluoroethylene, and hexafluoropropylene or 1- or 2-hydropentafluoropropylene; or a copolymer of tetrafluoroethylene, propylene and, optionally, vinylidene fluoride.

9. The composition according to claim 8 wherein the fluoropolymer comprises copolymerized units of i) vinylidene fluoride/hexafluoropropylene; ii) vinylidene fluoride/ hexafluoropropylene/tetrafluoroethylene; iii) tetrafluoroethylene/propylene; or iv) tetrafluoroethylene/propylene/vinylidene fluoride.

10. The composition according to claim 7 comprising from 0.001 to 1.0 percent of fluoropolymer based on total composition weight.

11. The composition according to claim 5 wherein Component C) comprises an interfacial agent selected from polycaprolactones, poly(oxyalkylene) compounds and polyester polyols.

12. The composition according to claim 11 wherein the interfacial agent corresponds to the formula:

$A[(OR^1)_xOR^2]_y$, where

A is the residue of an initiator having one or more active hydrogen atoms;

y is 2, 3 or 4;

$R^1$ independently each occurrence can be the same or different, and is selected from the group consisting of $C_{1-8}$ alkylene groups;

x is the number from 1 to 1000; and $R^2$ is H or a $C_{1-10}$ monovalent organic radical.

13. The composition according to claim 11 wherein the interfacial agent is a polycaprolactone polymer.

14. The composition according to claim 12 wherein the interfacial agent is present in a molar amount from 0.5:1 to 5:1 based on fluoropolymer.

* * * * *